(12) United States Patent
Dixon et al.

(10) Patent No.: US 8,991,699 B2
(45) Date of Patent: Mar. 31, 2015

(54) ASSOCIATION OF CONTACTLESS PAYMENT CARD PRIMARY ACCOUNT NUMBER

(75) Inventors: Philip B. Dixon, San Diego, CA (US); Christopher Lee Knauft, Bellingham, WA (US)

(73) Assignee: Cubic Corporation, San Diego, CA (US)

( * ) Notice: Subject to any disclaimer, the term of this patent is extended or adjusted under 35 U.S.C. 154(b) by 451 days.

(21) Appl. No.: 12/877,691

(22) Filed: Sep. 8, 2010

(65) Prior Publication Data
US 2011/0220718 A1    Sep. 15, 2011

Related U.S. Application Data

(60) Provisional application No. 61/240,612, filed on Sep. 8, 2009.

(51) Int. Cl.
*G06K 5/00* (2006.01)
*G06K 7/01* (2006.01)
*G06Q 20/34* (2012.01)
(Continued)

(52) U.S. Cl.
CPC .......... *G07F 17/0014* (2013.01); *G06Q 20/352* (2013.01); *G06Q 40/02* (2013.01)
USPC ..................................... 235/382.5; 235/380

(58) Field of Classification Search
CPC ... G06Q 20/40; G06Q 20/3278; G06Q 40/00; G06Q 20/3572; G06Q 20/341; G06Q 20/327; G06Q 40/02; G06Q 20/3821; G06Q 20/352; G06Q 20/22; G07F 7/1008; G07F 7/086; G07F 17/0014; G07F 7/0866

USPC .................................. 235/380, 382, 492, 375
See application file for complete search history.

(56) References Cited

U.S. PATENT DOCUMENTS 5,530,232 A    6/1996    Taylor
5,627,355 A    5/1997    Rahman et al.
(Continued)

FOREIGN PATENT DOCUMENTS

EP    666549 A1    8/1995
EP    1431891 A1    6/2004
(Continued)

OTHER PUBLICATIONS

U.S. Appl. No. 12/833,258, filed Jul. 9, 2010, Non-Final Rejection mailed Oct. 4, 2013, 21 pages.
(Continued)

*Primary Examiner* — Thien T Mai
(74) *Attorney, Agent, or Firm* — Kilpatrick Townsend & Stockton LLP

(57) ABSTRACT

Embodiments of methods and machines are disclosed for enabling contactless devices, such as contactless payment cards and other devices having near-field communication (NFC) capabilities, for use as fare media in a transit and/or transportation system. Embodiments include reading contactless data from a contactless device and associating it with information received from another source on the device. For example, associating a primary account number (PAN) and/or other information received from a contactless payment card's contactless interface with a PAN obtained from a magnetic stripe of the contactless payment card. The information can then be further associated with one or more products and/or a transit user account.

21 Claims, 12 Drawing Sheets

(51) Int. Cl.
  *G06Q 40/02* (2012.01)
  *G07F 17/00* (2006.01)

(56) References Cited

U.S. PATENT DOCUMENTS

| | | |
|---|---|---|
| 6,018,717 A | 1/2000 | Lee et al. |
| 6,070,141 A | 5/2000 | Houvener et al. |
| 6,259,769 B1 | 7/2001 | Page et al. |
| 6,726,100 B2 | 4/2004 | Lauper et al. |
| 6,736,322 B2 | 5/2004 | Gobburu et al. |
| 6,913,193 B1 | 7/2005 | Kawan |
| 7,306,143 B2 | 12/2007 | Bonneau, Jr. et al. |
| 7,417,306 B1 | 8/2008 | Jacobsen et al. |
| 7,562,818 B1 | 7/2009 | Bierbaum et al. |
| 7,664,676 B2 | 2/2010 | Van Do et al. |
| 7,766,225 B2 | 8/2010 | Walsh et al. |
| 7,886,974 B2 | 2/2011 | Abbiss et al. |
| 7,991,694 B2 | 8/2011 | Takayama |
| 8,118,223 B2 | 2/2012 | Hammad et al. |
| 8,135,240 B2 | 3/2012 | Satoh |
| 8,240,561 B2 | 8/2012 | Busch-Sorensen |
| 8,306,512 B2 | 11/2012 | Dixon et al. |
| 8,350,668 B2 | 1/2013 | Busch-Sorensen |
| 8,688,554 B2 | 4/2014 | Hammad et al. |
| 2001/0011255 A1 | 8/2001 | Asay et al. |
| 2001/0018660 A1 | 8/2001 | Sehr |
| 2002/0043566 A1 | 4/2002 | Goodman et al. |
| 2002/0099605 A1 | 7/2002 | Weitzman et al. |
| 2002/0170962 A1 | 11/2002 | Besling et al. |
| 2003/0046249 A1 | 3/2003 | Wu |
| 2003/0085272 A1 | 5/2003 | Andrews et al. |
| 2003/0126012 A1 | 7/2003 | Watts et al. |
| 2004/0056087 A1 | 3/2004 | Bonneau, Jr. et al. |
| 2004/0177045 A1 | 9/2004 | Brown |
| 2004/0230535 A1 | 11/2004 | Binder et al. |
| 2005/0070257 A1 | 3/2005 | Saarinen et al. |
| 2005/0278216 A1 | 12/2005 | Graves |
| 2006/0064379 A1 | 3/2006 | Doran et al. |
| 2006/0179003 A1 | 8/2006 | Steele et al. |
| 2006/0218038 A1 | 9/2006 | Grider |
| 2006/0237528 A1 | 10/2006 | Bishop et al. |
| 2008/0033880 A1 | 2/2008 | Fiebiger et al. |
| 2008/0051059 A1 | 2/2008 | Fisher |
| 2008/0051122 A1 | 2/2008 | Fisher |
| 2008/0052192 A1 | 2/2008 | Fisher |
| 2008/0052233 A1 | 2/2008 | Fisher et al. |
| 2008/0116264 A1* | 5/2008 | Hammad et al. ............ 235/382 |
| 2008/0126251 A1 | 5/2008 | Wassingbo |
| 2008/0128513 A1 | 6/2008 | Hammad et al. |
| 2008/0179394 A1 | 7/2008 | Dixon et al. |
| 2008/0183589 A1 | 7/2008 | Dixon et al. |
| 2008/0195428 A1 | 8/2008 | O'Sullivan |
| 2008/0195457 A1 | 8/2008 | Sherman |
| 2008/0201212 A1 | 8/2008 | Hammad et al. |
| 2008/0203151 A1 | 8/2008 | Dixon et al. |
| 2008/0203156 A1 | 8/2008 | Liu et al. |
| 2008/0208681 A1 | 8/2008 | Hammad et al. |
| 2008/0255890 A1 | 10/2008 | Hilliard |
| 2008/0288355 A1 | 11/2008 | Rosen |
| 2008/0319901 A1 | 12/2008 | Brown |
| 2009/0055893 A1 | 2/2009 | Manessis et al. |
| 2009/0060393 A1 | 3/2009 | Satoh |
| 2009/0072024 A1 | 3/2009 | Bonneau, Jr. et al. |
| 2009/0103730 A1 | 4/2009 | Ward et al. |
| 2009/0106116 A1 | 4/2009 | Zingsheim |
| 2009/0124234 A1 | 5/2009 | Fisher et al. |
| 2009/0132362 A1 | 5/2009 | Fisher et al. |
| 2009/0144161 A1 | 6/2009 | Fisher |
| 2009/0156190 A1 | 6/2009 | Fisher |
| 2009/0171682 A1 | 7/2009 | Dixon et al. |
| 2009/0184163 A1 | 7/2009 | Hammad et al. |
| 2009/0255996 A1 | 10/2009 | Brown et al. |
| 2009/0265260 A1 | 10/2009 | Aabye et al. |
| 2009/0271211 A1 | 10/2009 | Hammad |
| 2010/0089995 A1 | 4/2010 | El-Awady et al. |
| 2010/0169175 A1 | 7/2010 | Koran |
| 2010/0188195 A1 | 7/2010 | Sorensen |
| 2010/0224682 A1 | 9/2010 | Busch-Sorensen |
| 2010/0312605 A1 | 12/2010 | Mitchell et al. |
| 2010/0312619 A1 | 12/2010 | Ala-Pietila et al. |
| 2011/0165836 A1 | 7/2011 | Dixon et al. |
| 2011/0165866 A1 | 7/2011 | Dixon et al. |
| 2011/0166914 A1 | 7/2011 | Dixon et al. |
| 2011/0166936 A1 | 7/2011 | Dixon et al. |
| 2011/0166997 A1 | 7/2011 | Dixon et al. |
| 2012/0101927 A1 | 4/2012 | Leibon et al. |
| 2012/0278137 A1 | 11/2012 | Dixon et al. |
| 2013/0066689 A1 | 3/2013 | Dixon et al. |

FOREIGN PATENT DOCUMENTS

| | | |
|---|---|---|
| EP | 2452299 A1 | 5/2012 |
| KR | 10-0467260 B1 | 1/2005 |
| KR | 10-0823210 B1 | 4/2008 |
| WO | 97/10560 A1 | 3/1997 |
| WO | 2005/013169 A1 | 2/2005 |
| WO | 2006/124808 A2 | 11/2006 |
| WO | 2008/039796 A2 | 4/2008 |
| WO | 2008/070642 A2 | 6/2008 |
| WO | 2009/060393 A2 | 5/2009 |
| WO | 2011/006140 | 1/2011 |
| WO | 2013/173581 A2 | 11/2013 |

OTHER PUBLICATIONS

U.S. Appl. No. 12/833,258, filed Jul. 9, 2010, Advisory Action mailed Sep. 9, 2013, 3 pages.
U.S. Appl. No. 12/833,258, filed Jul. 9, 2010, Final Office Action mailed May 10, 2013, 22 pages.
U.S. Appl. No. 12/833,258, filed Jul. 9, 2010, Final Office Action mailed Jun. 6, 2012, 15 pages.
U.S. Appl. No. 12/833,258, filed Jul. 9, 2010, Non-Final Action Office Action mailed Nov. 26, 2012, 21 pages.
U.S. Appl. No. 12/833,258, filed Jul. 9, 2010, Non-Final Action Office Action mailed Dec. 22, 2011, 14 pages.
U.S. Appl. No. 12/833,378, filed Jul. 9, 2010, Advisory Action mailed Mar. 11, 2013, 3 pages.
U.S. Appl. No. 12/833,378, filed Jul. 9, 2010, Final Office Action mailed Jan. 3, 2013, 12 pages.
U.S. Appl. No. 12/833,378, filed Jul. 9, 2010, Non-Final Office Action mailed Aug. 1, 2012, 15 pages.
U.S. Appl. No. 12/833,358, filed Jul. 9, 2010, Advisory Action mailed Jan. 25, 2013, 3 pages.
U.S. Appl. No. 12/833,358, filed Jul. 9, 2010, Final Office Action mailed Nov. 9, 2012, 10 pages.
U.S. Appl. No. 12/833,358, filed Jul. 9, 2010, Non-Final Office Action mailed Jul. 23, 2012, 14 pages.
U.S. Appl. No. 12/833,386, filed Jul. 9, 2010, Non-Final Office Action mailed Jan. 2, 2013, 17 pages.
U.S. Appl. No. 12/833,404, filed Jul. 9, 2010, Final Office Action mailed Apr. 12, 2013, 12 pages.
U.S. Appl. No. 12/833,404, filed Jul. 9, 2010, Non-Final Office Action mailed Jul. 30, 2012, 9 pages.
U.S. Appl. No. 13/281,272, filed Oct. 25, 2011, Non-Final Office Action mailed Aug. 6, 2013, 8 pages.
Author Unknown, "A Pre-Authorised National Payment Card has been launched in Kazakhstan", Open Way Payment Processing Solutions, dated Feb. 12, 2005, found online at http://www.openwaygroup.com/news_card.jsp?dcion=350&rgn=1&1ng=1, 3 pages.
Author Unknown, "Blacklisting." *Wikipedia, The Free Encyclopedia*. Wikimedia Foundation, Inc., revised Jun. 21, 2009, 3 pages. Accessed at: http://en.wikipedia.org/w/index . . . .
Author Unknown, "EMV '96 Integrated Circuit Card Application Specification for Payment Systems", Internet Citation, 1996, retrieved on Dec. 29, 2005 from internet at http://www.ttfn.net/techno/smartcards/applspec.pdf, pp. 23-31.
Fleishman, D., et al., "TCRP Report 32: Multipurpose Transit Payment Media", Transit Cooperative Research Program, Transportation

(56) References Cited

OTHER PUBLICATIONS

Research Board, National Research Council, National Academy Press, Washington, D.C., 1998, 140 pages.
Author Unknown, Mastercard Worldwide, "An Introduction to Chip: For Issuers and Acquirers", 2007, 52 pages.
Author Unknown, "Mosaic Software's Postilion Supports MasterCard's OneSMART Pre-Authorized Solution", Press Release, Bob's Guide, Nov. 2, 2004, 2 pages.
PCT International Search Report and Written Opinion mailed Aug. 18, 2010; International Application No. PCT/US2010/041621, 7 pages.
PCT International Search Report and Written Opinion mailed Oct. 22, 2010; International Application No. PCT/US2010/041625, 8 pages.
PCT International Search Report and Written Opinion mailed Sep. 23, 2010; International Application No. PCT/US2010/041624, 9 pages.
PCT International Search Report and Written Opinion mailed Sep. 7, 2010; International Application No. PCT/US2010/041622, 8 pages.
PCT International Search Report and Written Opinion of PCT/US2010/041623 mailed on Feb. 8, 2012, 7 pages.
Australian Patent Examination Report No. 1 for No. 2010271244 received Mar. 13, 2014, 3 pages.
Australian Patent Examination Report No. 1 for No. 2010271242 issued May 1, 2014, 3 pages.
Australian Patent Examination Report No. 1 for No. 2010271245 issued Mar. 28, 2014, 5 pages.
PCT International Search Report and Written Opinion mailed Dec. 9, 2013 for PCT/US2013/041351, 11 pages.
U.S. Appl. No. 13/281,272, filed Oct. 25, 2011, Final Office Action mailed Jan. 15, 2014, 11 pages.
U.S. Appl. No. 13/610,127, filed Sep. 11, 2012, Non-Final Office Action mailed Apr. 24, 2014, 23 pages.

\* cited by examiner

ASSOCIATION OF CONTACTLESS PAYMENT CARD PRIMARY ACCOUNT NUMBER

The present application claims benefit under 35 USC 119 (e) of U.S. Provisional Application No. 61/240,612, filed on Sep. 8, 2009, entitled "Association of Contactless Bank Card PAN," the entire contents of which are incorporated herein by reference for all purposes.

CROSS-REFERENCES TO RELATED APPLICATIONS

The present application is also related to U.S. patent application Ser. No. 12/833,404, filed on Jul. 9, 2010, entitled "Reloadable Prepaid Card Distribution, Reload, And Registration In Transit," which is incorporated herein by reference for all purposes.

BACKGROUND

As transit systems throughout the world continue to mature, so do the technologies that support them. Many transit systems use impersonalized fare media that carry a value, such as stored-value cards, but other transit systems are taking a more personalized, account-based approach. Account-based transit systems can provide transit users with a personalized account, which can store product and funding information. Because value is associated with an account rather than a fare media, a transit system can disable a lost or stolen fare media and issue a new fare media to a transit user without the loss of any value to either the transit user or the transit system.

Because fare media does not store value in these account-based transit systems, items other than those issued by a transit system may be enabled for use as fare media. Payment cards, for example, can be configured for use in such account-based transit systems. For transit systems utilizing wireless, or contactless, technology, contactless payment cards may be used. Problems can arise, however, when information such as the primary account number (PAN) of the contactless data transmitted by a contactless payment card does not match the PAN imprinted or embossed on the card, or when multiple contactless payment cards have the same PAN.

BRIEF SUMMARY

Embodiments of methods and machines are disclosed for enabling contactless devices, such as contactless payment cards and other devices having near-field communication (NFC) capabilities, for use as fare media in a transit and/or transportation system. Embodiments include reading contactless data from a contactless device and associating it with information received from another source on the device. For example, associating a primary account number (PAN) and/or other information received from a contactless payment card's contactless interface with a PAN obtained from a magnetic stripe of the contactless payment card. The information can then be further associated with one or more products and/or a transit user account.

According to one embodiment, a method for enabling a first handheld media having NFC capabilities for use as fare media in a transit system providing account-based products can include receiving a first account identifier from a first source of the first handheld media. The first account identifier can be unique to the first handheld media and the first account identifier can include a PAN. The first source can comprise an NFC interface. The method additionally can include receiving a second account identifier from a second source of the first handheld media, the second account identifier being different than the first account identifier. A transit user account can be created for managing transactional information of a user of the transit system, the transit user account having information including the first account identifier and second account identifier, and information associating the account with a transit product. The method further can include enabling the first handheld media for use as fare media at one or more access control points of the transit system, receiving, at an access point of the transit system, a third account identifier from an NFC interface of a second handheld media, the third account identifier including the PAN of the first account identifier, and determining that the second handheld media is not associated with the transit product associated with the first handheld media. Finally, the method can include denying a person the ability to use the transit product associated with the first handheld media based, at least in part, on the determination.

The embodiment can include further features. For example the first account identifier further can include a sequence code, a name of an account holder, and/or an expiry date. The second account identifier can comprise a PAN, a name of an account holder, and/or an expiry date. Moreover, if the second account identifier comprises a PAN, the PAN of the second account identifier can be different than the PAN of the first account identifier.

The embodiment contemplates other features. For instance, the second source of the first handheld media can comprise a magnetic stripe, a bar code, and/or a visible number or code. It may further provide an activation code at a first location and receive the activation code at a second location prior to the enabling the first handheld media for use as fare media at the one or more access control points of the transit system. The method can comprise receiving information from the user of the transit system and including at least a portion of the information received from the user of the transit system in the transit user account.

According to this embodiment, the first handheld media can comprise a contactless payment card, an identification card, a mobile device with NFC capabilities, or a radio frequency identification (RFID) tag. Moreover, if first handheld media can comprise a contactless payment card the method further can comprise receiving payment for the transit product funded with a financial account associated with the payment card.

Another embodiment contemplates a machine for enabling a contactless device for use as fare media in a transportation system providing account-based products, the machine comprising a network interface configured to communicate with a network and first and second input interfaces. The first input interface can be configured to receive information from radio frequency (RF) signals, and the second input interface can be configured to receive information. The machine can further include a processor communicatively coupled with the network interface, the first and second input interfaces, and a memory. The memory can have instructions that, when executed by the processor, cause the machine to receive RF signals with the first input interface in which the RF signals communicate a first account identifier from a first source of the contactless device. The first account identifier can include data unique to the contactless device. The machine further can receive, with the second input interface, a second account identifier from a second source of the contactless device that is different than the first account identifier. Additionally, the machine can send, with the network interface, information including the first account identifier and second account identifier and receive, with the network interface, an activation code for enabling the contactless device for use as fare media at one or more access control points of the transportation system. Finally, the machine can provide the activation code to a user of the machine.

Additional features of this embodiment are specified. For example, the second input interface can comprise a magnetic stripe reader, a bar code reader, a keyboard, a keypad, or a touchscreen. The machine also can comprise a receipt printer, wherein the machine provides the activation code on a receipt. The first account identifier, the second identifier, or both, can comprise a PAN. Moreover, the machine further can receive information from the user of the machine and send, with the network interface, at least a portion of the information from the user of the machine. Additionally, the machine can comprise a third input interface configured to receive the information from the user of the machine. Information from the user of the machine can include a unique identifier of the user, a passcode and/or personal identification number (PIN), a funding source, a payment amount, a name, an address, a telephone number, an indicator of an opt-in and/or opt-out selection, an email address, and/or a product and/or service of the transit system. The contactless device can comprise a payment card, an identification card, a mobile device with near-field communication (NFC) capabilities, and/or a radio frequency identification (RFID) tag. Finally, if the contactless device comprises a payment card; and the machine can receive payment for the transit product, wherein the payment is funded with a financial account associated with the payment card.

Yet another embodiment contemplates a method for enabling a payment card for use as fare media in a transit system providing account-based products. This method can comprise creating a transit user account for managing transactional information of a user of the transit system. The transit user account can have information associated with the user and a transit product. A first account identifier can be received from a first of the payment card, and the first account identifier can include data unique to the payment card and can be stored on a first account information repository of the payment card and communicated with a contactless interface of the payment card. The method further can include receiving a second account identifier from a second account information repository of the payment card, where the second account identifier is different than the first account identifier. The first and second account identifiers can be associated with the transit user account, and the payment card can be enabled for use as fare media at one or more access control points of the transit system. Finally, the method can additionally include receiving, at an access point of the transit system, the first account identifier from the contactless interface of the payment card and providing the user of the transit system the ability to use the transit product associated with the transit user account.

Further features of this embodiment are contemplated. For instance, if the payment card comprises a first payment card and the first account identifier comprises a PAN, the method can include receiving, at an access point of the transit system, a third account identifier from a contactless interface of a second payment card, the third account identifier including the PAN of the first account identifier. It may further include determining that the second payment card is not associated with the transit product and denying a person ability to use the transit product associated with the first payment card based, at least in part, on the determination. As with other embodiments contemplated herein, the second account information repository of the payment card can comprises a magnetic stripe, a bar code, and/or a visible number or code.

DETAILED DESCRIPTION

Figure 1:
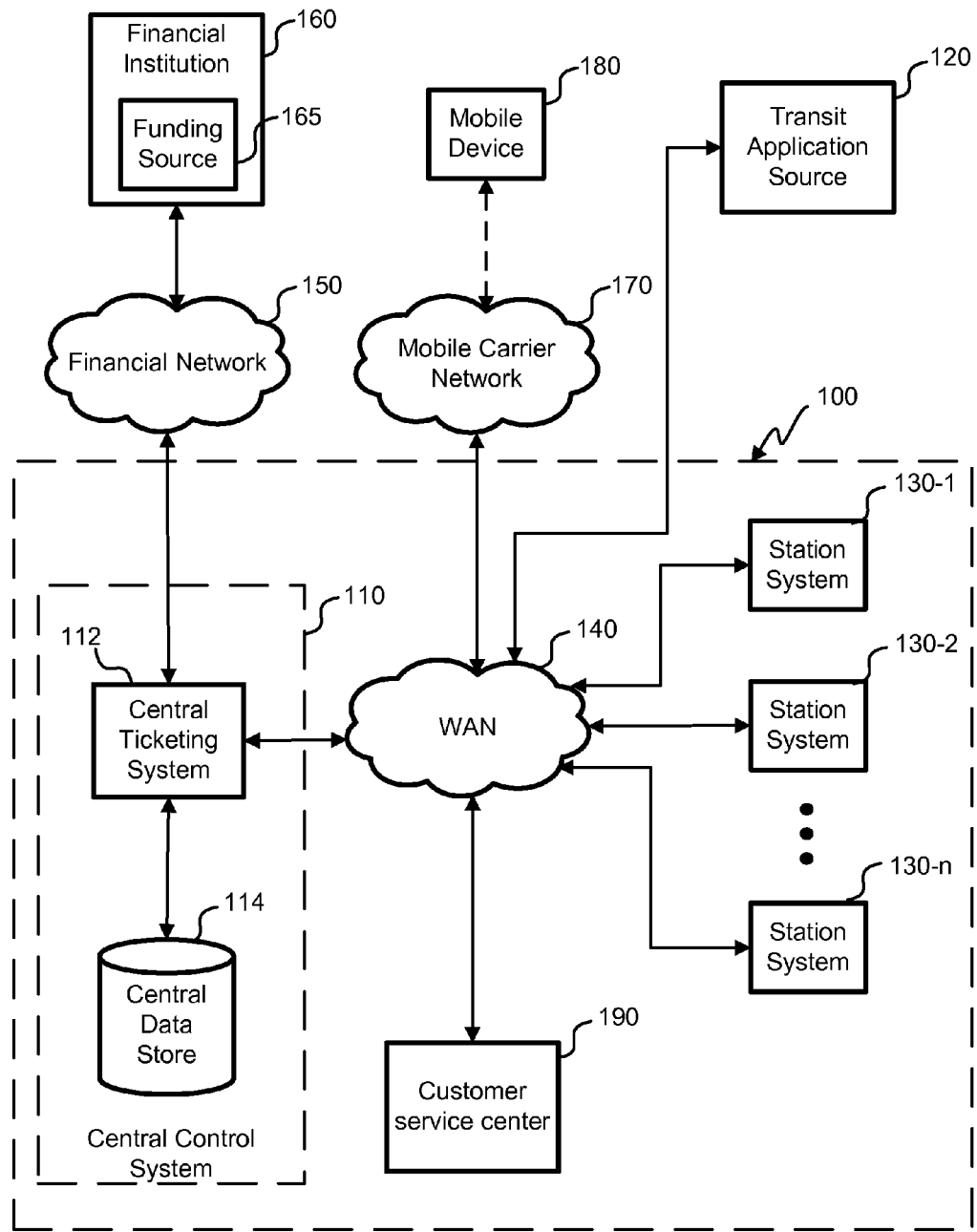
FIG. 1 is a block diagram of an embodiment of a transit system providing transit user accounts for management of transactions of a user of the transit system.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The term "payment brand" as used herein includes, but is not limited to payment card networks, such as VISA®, MASTERCARD®, AMERICAN EXPRESS®, and DISCOVER®. These networks may issue payment cards, such as reloadable prepaid cards, directly or though a separate card issuer, such as an authorized issuing bank. Furthermore, payment-branded cards as described herein may be "co-branded," meaning that the cards may be accepted, issued, and/or authorized by a transit agency or other entity in addition to a bank and/or payment brand.

Account-based transit systems are uncommon among current transit systems. Because transit systems require quick transactions, it is easier to use stored-value fare media (e.g., fare media, such as a transit fare card, that can store a value and a trip history on the card). However, encoding the value or transit product onto a fare media, rather than associate the value or fare media to a transit user, has its limitations. If the fare media is lost or stolen, it is difficult to remove the value from the lost or stolen fare media and restore it to a transit user. On the other hand, an account-based transit system can enable a transit user to enroll a variety of items as fare media. The fare media can be disabled if lost or stolen, without any lost value to the account. And the account may be linked to a funding source for convenient value top up and product purchases.

FIG. 1 illustrates a block diagram of an embodiment of a transit system 100, in communication with other systems, providing transit user accounts for management of transactions of users of the transit system 100. The transit system can include various forms of transit, including subway, bus, ferry commuter rail, para-transit, etc., or any combination thereof. The transit user account can comprise information regarding a certain user of the transit system 100, such as a name, address, phone number, email address, user identification (such as a unique identifier of the user or other user ID), passcode (such as a password and/or personal identification number (PIN)), an identification code associated with a fare media used to identify a user and/or a transit user account (such as a primary account number (PAN)), information regarding user preferences and user opt-in or opt-out selections for various services, product(s) associated with the transit user account, a value and/or credit associated with the product(s), information regarding a funding source 165 for the transit user account, and more. The transit user account can further comprise funding and transaction information, such as product information, a funding source, and a payment amount. A transit user may request a transit user account and provide the information listed above by phone (such as a call to a customer service center 190 maintained and/or provided by the transit service provider of the transit system 100), on the Internet, at ticket booth, at a ticket venting machine, or by other means. A central ticketing system 112, which can comprise of one or more servers and/or other computing systems having processors, memories, and network interfaces for processing and communicating information. The central ticketing system 112 can use the information provided by the user to create the transit user account, which can be stored and/or maintained on a database, such as a central data store 114 of a central control system 110. It will be recognized that such a transit system 100 can be enabled for use in applications beyond transit, such as transportation systems (e.g., airline systems, car rental systems, etc.).

A funding source 165 for a transit user account can provide funding to purchase products of the transit services system. It can be external to the central control system 110 and maintained, for example, by a financial institution 160. Such a funding source 165 may include a savings or checking account, a prepaid account, a credit account, an e-commerce account (such as a PAYPAL® account), or more, which can transfer funds via automated clearing house (ACH) or other means. If a transit user account comprises information regarding a funding source 165 for the account, the central ticketing system 112 can use the information to fund purchases or other transactions of a user of the transit system 100. These transactions can be made at stations, on the Internet, by phone, text, email, or a variety of other different ways, and transaction information can then be sent to the central ticketing system 112 to update the transit user account associated with the transactions and reconcile payments and purchases with the funding source 165. The central ticketing system 112 can communicate with the financial institution 160 (or other entity maintaining the funding source 165) through a financial network 150.

The central ticketing system's reconciliation with a funding source 165 may vary depending on one or more products associated with the transit user account and the functionality desired by a transit services provider. For example, the transit user account may include a running balance mirroring a balance of the funding source 165. In such a case, transactions, such as passage of a user at an access control point (such as a turnstile, faregate, platform validator, para-transit vehicle, bus, conductor handheld unit, or fare box at a entry, exit, or other location of a transit station) can be recorded and/or tracked by the central ticketing system 112 and reconciled, on a per-transaction basis and/or collectively with other transactions. Along these lines, the central ticketing system 112 may reconcile payment for the transactions with the funding source 165 as the transactions are received and/or on a scheduled basis, such as on an hourly or daily basis.

Additionally or alternatively, when transit products or services are associated with a transit user account, the central ticketing system 112 can draw funds from a funding source 165 less frequently. For example, a transit product can include a certain number of rides or an unlimited number of rides for a certain period of time. In this case, the central ticketing system 112 can track transactions associated with the passage of a user at an access control point (i.e., transactions in the transit system associated with a ride), but may only need to reconcile with the funding source 165 once, for the purchase of the transit product.

The transit user account may further include information regarding a user's preferences with regard to funding. For example, the transit user account may be configured to automatically draw a certain amount of funds from the funding source 165 each month to pay for a certain transit product or service, or to add value and/or credits to an existing transit product or service. The value and/or credits can include a monetary credit, a usage credit, and/or a usage period. Additionally or alternatively, the transit user account can be configured to automatically withdraw a certain amount of funds from the funding source 165 to add additional value and/or credits to an existing product when the value and/or credits of the existing product drops below a certain threshold level. Various other configurations are allowable by the transit user account. It will be understood that other systems of the transit system 100, such as a station system 130, may draw funds from a funding source 165. Moreover, because cash payments can also be used to fund transactions associated with a transit user account, the transit user account may not require funding source 165.

Transactions of a user, such as passage at a transit access control points, can frequently occur at stations of the transit system 100, although it will be understood that access control points can exist elsewhere, such as on busses or trains. Station systems 130 can gather information regarding transactions and communicate the information to the central ticketing system 112 using a wide area network (WAN) 140. The WAN 140 can include one or more networks, such as the Internet, that may be public, private, or a combination of both. The WAN 140 could be packet-switched or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of fare media throughout the transit system 100 can be tracked.

In this embodiment, a central ticketing system 112 and a central data store 114 are shown for the central control system 110. As discussed above, central ticketing system 112 receives periodic reports upon how credits or debits are being processed throughout the system 100. Additionally, changes in schedules, ticket prices, and delay notifications can be communicated from the central control system 112 to the station systems 130 via the WAN 140.

A mobile device 180 may be communicatively coupled with the central control system 110. Such a mobile device may be a smart phone or other mobile phone (including a near-field-communication (NFC)-enabled mobile phone), a tablet personal computer (PC), a personal digital assistant (PDA), an e-book reader, or other device. In transit system 100, a communicative link from mobile device 180 to central ticketing system 112 can be provided by a mobile carrier network 170 in communication with WAN 140. Mobile device 180 can thereby communicate with the central ticketing system 112 to access and/or manage information of a transit user account. Furthermore, the central ticketing system 112 can send messages to the mobile device 180, providing transit, account, and/or advertisement information to a user of the transit system 100 in possession of the mobile device 180. Such messages may be based on, among other things, opt-in or opt-out selections and/or other user preferences as stored in a transit user account.

A transit user can use mobile device 180 to download a transit application from a mobile application source 120. The transit application source 120 may be an application store or website provided by a mobile carrier, the hardware and/or software provider of the mobile device 180, and/or the transit service provider. The transit application can be uploaded or otherwise provided to transit application source 120 by the transit service provider. According to some embodiments, the transit application can provide additional functionality of mobile device 180, including enabling an NFC-enabled mobile device to be used as fare media and access control points of the transit system 100.

Figure 2:
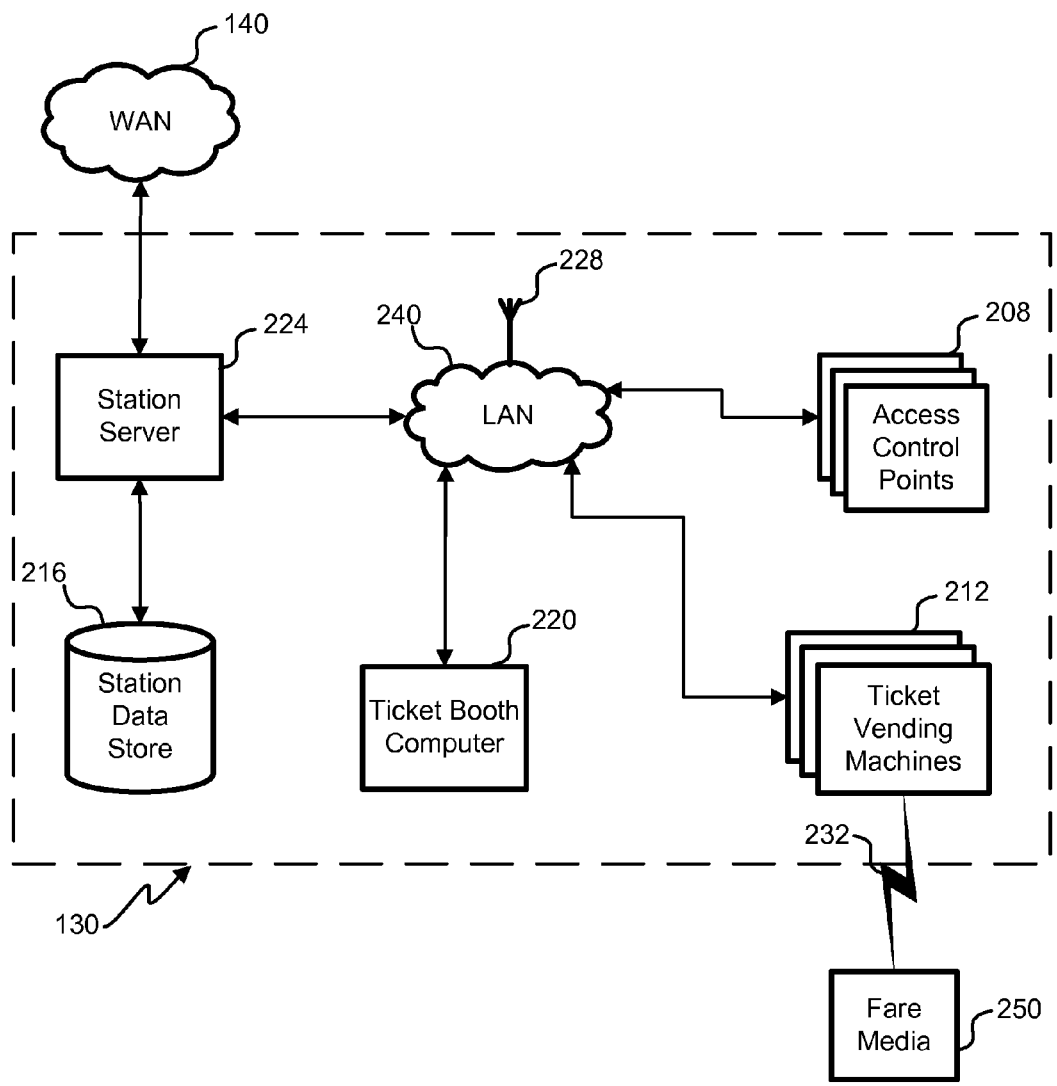
FIG. 2 is a block diagram of an embodiment of a transit station system.

FIG. 2 shows a block diagram of an embodiment of a transit station system 130. As discussed above, transit system 100 can include various forms of transit, such as subway, bus, ferry, commuter rail, para-transit, and more. Because different forms of transit may require different functionality, various transit station systems 130 may have some or all of the components shown in the block diagram. A local area network (LAN) 240 couples the various systems together and could include point-to-point connections, packet switched connections, wireless connections, and/or other networking techniques.

A station computer server 224 can be coupled to the WAN 140 to allow communication with the central ticketing system 112. Processing of local information can be performed on the station computer server 224. For example, fare information, schedule information, delay update information, and other transit related information can be processed at the computer server 224 and communicated to the various other machines in the transit system 100.

A ticket booth computer 220, access control points 208, and transit vending machines (TVMs) 212 can communicate with the central ticketing system 112 through the station computer server 224 or directly with the central ticketing system 112 through LAN 240 or WAN 140 (e.g., the Internet). According to some embodiments, access control points 208 collect information from a user at various locations in the transit station system 130, and can come in various forms such as turnstiles, faregates, platform validators, para-transit vehicles, busses, conductor handheld units, and/or fare boxes. The access control points 208 can communicate with the station server 224 and/or central ticketing system 112 to determine whether to grant a user access when fare media has been presented at the access control points 208. If access control points communicate with a station server 224 during such transactions, identification codes of fare media, which can be used to link a transaction with a transit user account, may be stored on lists in the station data store 216. These lists can be updated on a regular basis to reflect other transactions of the fare media throughout the transit system 100. In other embodiments, identification codes of fare media 250 are stored at access control points 208.

Access control points 208 of the transit system 100 can be configured to read information from one or more sources of information on a fare media 250. To do so, access control points 208 can employ one or more technologies, such as WIFI, BLUETOOTH®, bar-code and/or other optical scanning Access control points 208 may also employ near-field communication (NFC) technologies to read information from RFID tags, NFC-enabled mobile devices (such as certain personal digital assistants (PDAs), mobile phones, and other portable and/or personal electronics), contactless payment cards, and other contactless devices.

The access control points 208, TVMs 212, and one or more ticket booth computers 220, can communicate with the station server 224 via the LAN 204. This communication can be transmitted via a physical connection or wireless connection via one or more antennas 228. Transactions at access control points 208, TVMs 212, and one or more ticket booth computers 220 can be communicated to the station server 224, stored at station data store 216, and/or transmitted to central ticketing system, which can update information in a transit user account accordingly.

Various portable and/or handheld media with a unique identifier can be used as fare media, whether or not the media is issued by a transit services provider. Such media can include identification cards, payment cards, personal electronic devices, bar codes and items having bar codes, contactless devices, and more. Contactless devices can include media having a unique identification code readable by access control points 208 though NFC signals (e.g., radio frequency (RF) signals). By way of example, but not by limitation, such contactless devices can include devices comprising RFID tags and/or RFID-tagged items, contactless payment cards (including but not limited to credit cards, prepaid cards, debit cards, or other bank cards or contactless smart cards.), contactless identification cards and/or fobs, and NFC-enabled mobile devices.

Fare media 250 can have multiple sources of information, which may be read automatically by certain systems and devices in the transit system 100, depending on desired functionality. For contactless devices, such sources can include an IC, memory, and/or contactless interface of the device. Additionally or alternatively, contactless devices and other forms of fare media 250 can include a magnetic stripe, a bar code, and/or data imprinted and/or embossed on the device, which can serve as additional sources of information. Contactless and other sources of information can serve as repositories of account information related to, for example, a financial or user account associated with the fare media 250 (which may not be associated with the transit system 100).

TVMs 212 may interact directly with a fare media 250 through, for example, a contactless connection 232. Although communication of the contactless connection 232 may be two way, fare media 250 may simply communicate an identification code to TVM 212. This can be done, for example, to authenticate a contactless device for use as fare media 250 in the transit system 100. A contactless device does not have to be issued by a transit service provider in order to be authenticated and used as fare media 250 in the transit system, as long as the information communicated by the fare media 250 to the TVM 212 (and subsequently to access control points 208 for passage in the transit system 100) serves to uniquely identify the fare media 250. Such an authentication process is provided in greater detail below.

All or part of the information communicated by the fare media 250 can be used as an identification code to identify the transit fare media 250. This identification code can comprise one or more fields of data including or based on information such as a name, a birth date, an identification number (such as a PAN), a social security number, a drivers license number, a media access control (MAC) address, an electronic serial number (ESN), an international mobile equipment identifier (IMEI), and more. Because the identification code is unique, it can be associated with a transit user account, and utilized by a user at a TVM 212 to access and/or update information associated with the transit user account.

In some instances, an identification code may be assigned by a transit service provider and written to the fare media 250, such as an NFC-enabled mobile device 280. For example, a transit application running on an NFC-enabled phone can generate or otherwise provide an identification code to be transmitted from the phone at access control points 208 of the transit system 100. In other instances, if TVM 212 is utilized to enable a user to create a transit user account, the TVM 212 may also write an identification code to an unused portion of a memory of the fare media, such as integrated circuit chip file space on a smart card or an NFC component on the NFC-enabled mobile device 280.

Figure 3:
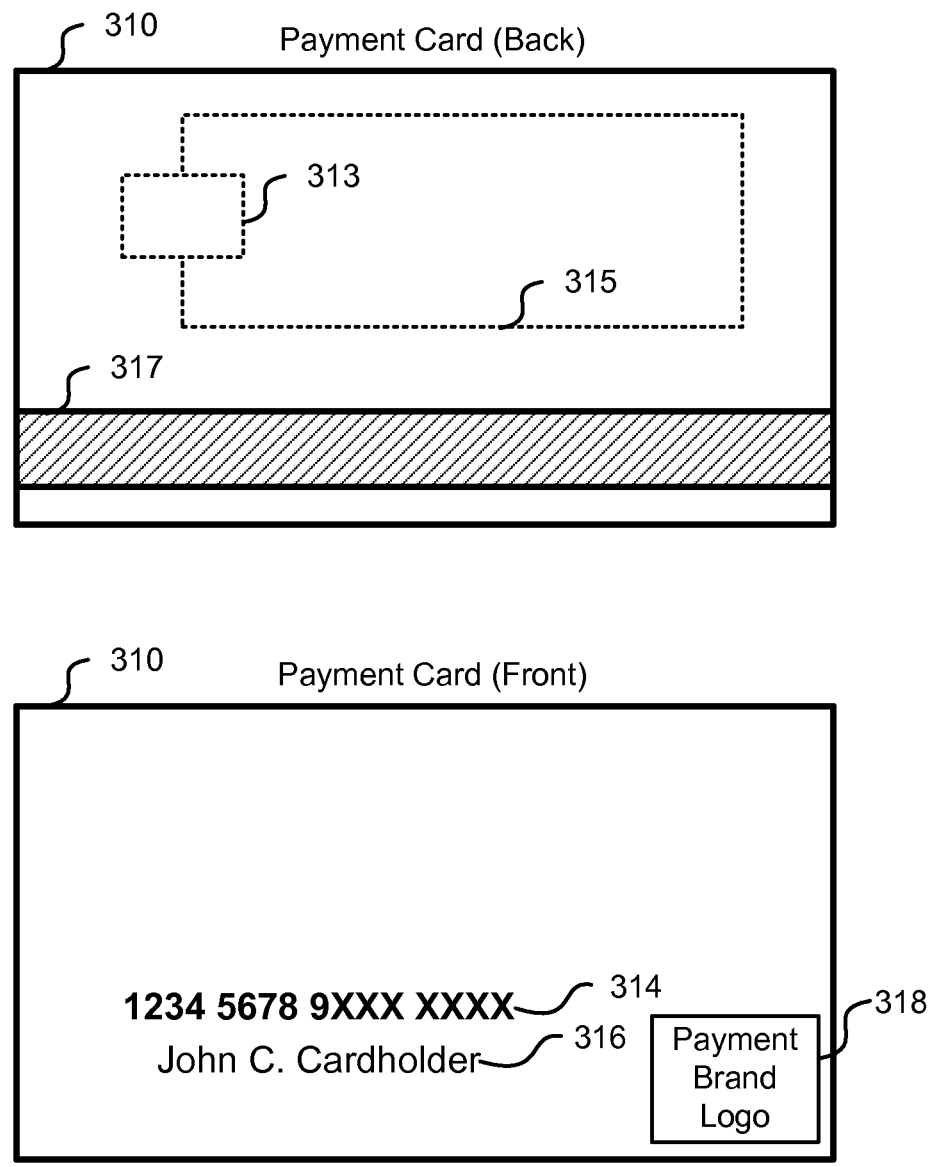
FIG. 3 is a simplified illustration of front and back views of a contactless payment card that can be enabled as fare media in a transit system, according to certain embodiments.

FIG. 3 illustrates front and back views of an embodiment of a contactless payment card 310 that can be enabled as fare media 250 in the transit system 100. Such contactless payment cards are widely available, can be issued by any of a wide variety of issuing banks, and can include a payment brand. The contactless payment card 310 can include an integrated circuit (IC) 313 configured to, among other things, store account information, such as a PAN, expiry date, name associated with an account, etc. The IC 313 can adhere to one or more relevant standards, such as the EMV standard, and can be coupled with an antenna 315 for communicating information wirelessly to a contactless card reader (not shown). Contactless payment cards 310 frequently adhere to standards set by the International Organization for Standardization and/or International Electrotechnical Commission (ISO/IEC), such as ISO/IEC 14443 or ISO/IEC 15693 standards for contactless smart card communications. The IC 313 and antenna 315 can be embedded in the payment card and are frequently not visible to a card user.

The contactless payment card 310 can include features and/or data common to other payment cards, as defined in other ISO/IEC standards, such as ISO/IEC 7810 and ISO/IEC 7813. This can include a magnetic stripe 317, a payment brand logo 318, an account number 314 (such as a PAN, which can be printed and/or embossed on the contactless payment card 310) and a cardholder name 316.

Processing of contactless payment cards in the transit system can be based on the PAN as the unique identification code. The PAN is available to an access control point 208 configured to read contactless track data from the contactless payment card 310. The PAN can be extracted from the track data and used to identify the card for account-based processing. Under most circumstances, the PAN imprinted and/or embossed on the front of the card is the same as the PAN found in the track data. However, there will be variations that the transit system 100 will have to contemplate. One variation can include multiple cards with the same PAN linked to one financial account, such as a husband and wife each having cards associated with a joint account, companion devices (such as another contactless payment card, an RFID-enabled sticker, a fob, etc.), or replacement/re-issue cards using the same PAN (where two valid cards exist that could be used until the older card expires.) Another variation is a replacement/re-issue card having a different PAN than that of the card being replaced. An additional variation is an alternate PAN used in contactless mode that is different from the PAN imprinted and/or embossed on the face of the card or contained in the magnetic stripe data.

In the above circumstances, the contactless payment card issuer knows how to associate each card variation and can charge the single bank account as appropriate. The transit system 100, however, will not be able to automatically decipher most of these circumstances. Because the transit system 100 allows for account-based transactions, the inability to take into account the above circumstances can be problematic in many ways. For example, if a contactless payment card 310 is enabled for use as fare media 250 in a transit system 100 where there are multiple contactless payment cards 310 having the same PAN, each contactless payment card 310 may be used as fare media in the transit system 100. To further illustrate, if a transit user with a transit user account purchases a single, flat-fare monthly pass and associates the PAN of a contactless payment card 310 with the transit user account, each additional contactless payment card 310 having the same PAN could also be used as media fare 250 for the monthly pass. Thus, if the multiple contactless payment cards 310 are distributed among several people, each person essentially would receive a monthly pass where only one monthly pass was purchased.

If the contactless PAN stored in memory of the IC 313 of a contactless payment card 310 is different than the PAN imprinted and/or embossed 314 on the front of the card, additional difficulties arise. For example, it would be particularly difficult to allow a transit user to use the Internet to register the contactless payment card 310 for use as a fare media 250. Because access control points 208 are configured to read the contactless PAN from the contactless payment card 310, it would not avail the transit user to enter the imprinted and/or embossed PAN 314.

One way to solve this and other problems may be solved by providing the imprinted and/or embossed PAN 314 and the contactless pan beforehand. For example, a transit user can swiping and/or dipping the contactless payment card 310 at a TVM 212 or other device of the transit system 100 configured to read information the magnetic stripe 317, which frequently includes a PAN that including a PAN that matches the imprinted and/or embossed PAN 314. The device can also read the contactless PAN from the IC 313. The transit system can then associate the contactless PAN with the imprinted and/or embossed PAN 314, enabling a user to access the Internet subsequently and enter the imprinted and/or embossed PAN 314. The transit system 100 can then associate any additional user and/or product information with the contactless PAN, and enable the contactless payment card 310 for use as fare media in the transit system 100. More details describing this process are provided below.

Figure 4:
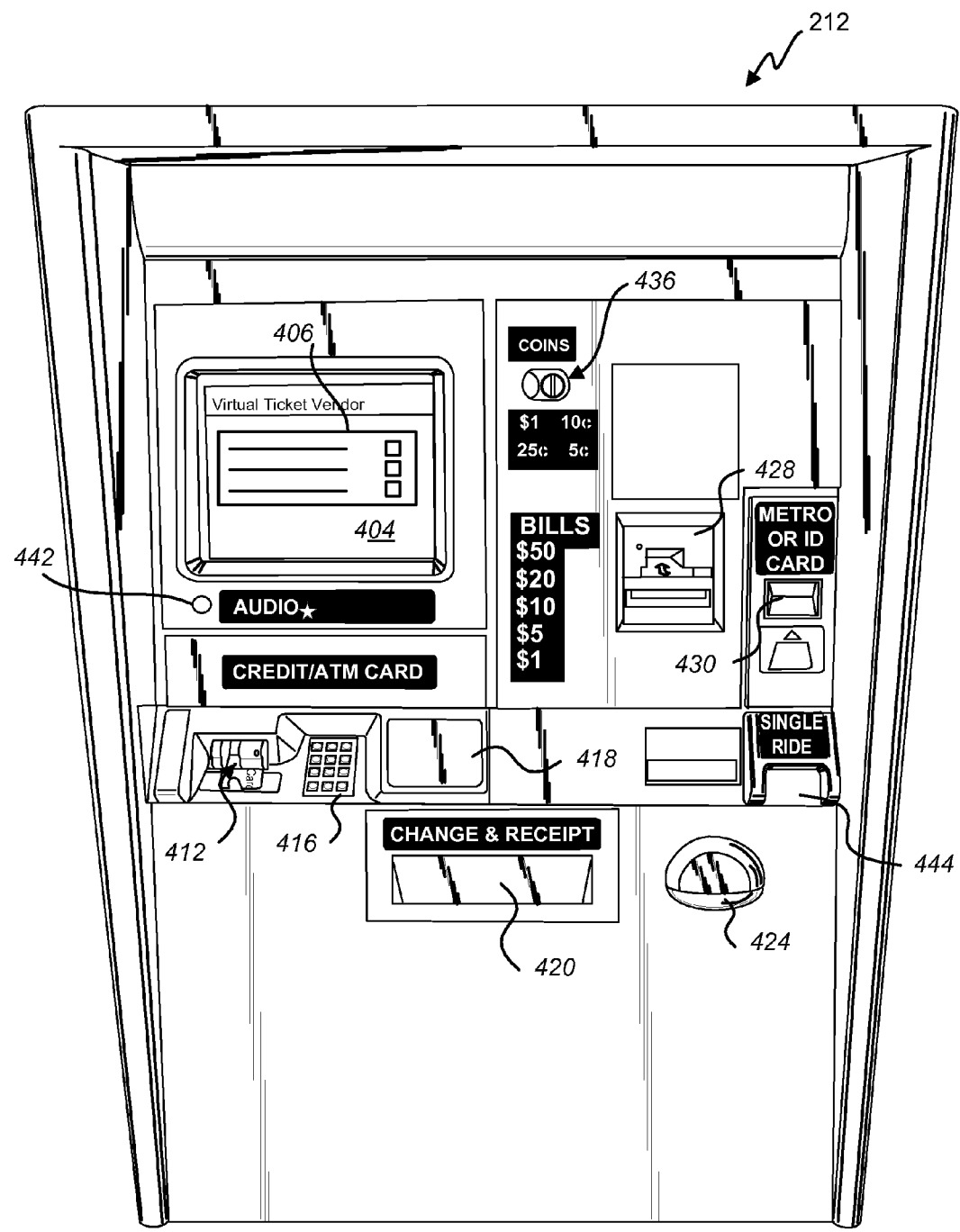
FIG. 4 is a perspective view of an embodiment of a transit vending machine that can be used to enable contactless devices, such as a contactless payment card, for use as fare media.
Figure 5:
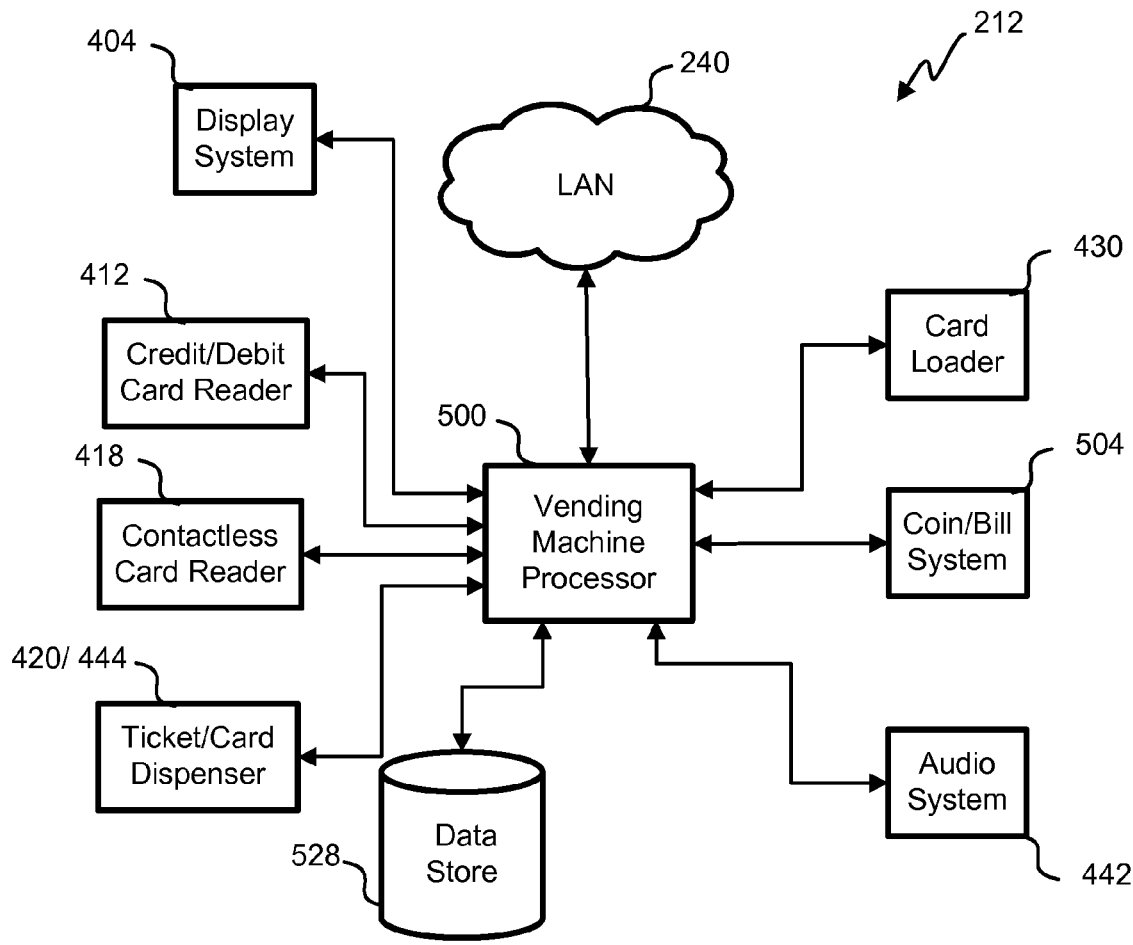
FIG. 5 is a block diagram of an embodiment of a transit vending machine that can be used to enable contactless devices, such as a contactless payment card, for use as fare media.

In FIGS. 4 and 5, a perspective view and block diagram of an embodiment of a TVM 212 are shown. A vending machine processor 500 is coupled to the other components of the TVM 212 and transmits and receives signals to and from the other subsystems to cause the other components to perform their intended functions. Fare cards can be purchased and/or reloaded with value at the TVM 212. A coin/bill system 504, magnetic stripe card reader 412, and contactless card reader 418 are used to make payments for transactions at the TVM 212. Additionally or alternatively, a contactless card reader 418 may be coupled with a magnetic stripe card reader 412 to enable simultaneous reading of contactless and magnetic stripe information. A keypad 416 is provided adjacent to the credit/debit card reader 412 to enter numerical information such as a PIN code for a debit card. A coin slot 436 and bill loader 428 are used to accept cash. Change is returned in a change/receipt slot 420 and coin return 424. Reloadable fare cards and receipts, including receipts having a activation code, are also provided in the change/receipt slot. TVM 212 may further dispense single-ride fare cards through card dispenser 444, which is coupled with a card storage unit (not shown) storing reloadable prepaid cards for distribution. Information regarding transactions may be communicated through a LAN 240 by the vending machine processor 500 using, for example, a network interface (not shown).

Information regarding transactions may be communicated to various entities. For example, a contactless PAN, a magnetic stripe PAN, and/or other information may be communicated to the central ticketing system 112 to create a transit user or temporary account. Additionally or alternatively, a PAN and other payment information may be transmitted to a card issuer or other financial institution 160 for payment of a transit product. The financial institution 160 can receive communication from TVM 51 via financial network 150, central ticketing system 42, and/or WAN 140. Moreover, a financial account associated with a contactless payment card 310 may comprise a funding source 165 maintained by a financial institution 160.

A display system 404 prompts the card holder through the refill/purchase process. For example, the screen prompts the purchaser to touch a start button/icon on a touch screen display of the display system 404 to begin the process. A textual display portion 406 can display textual instructions for the user after the process has begun. Additionally or alternatively, an audio system 442, including a speaker, can produce audio commands. The user can be given a menu of choices of how to proceed. For example, the menu may include choices to purchase or reload a reloadable fare card, purchase a single-ride fare card, purchase a product, setup a transit user account, and/or associate a contactless device, such as a contactless payment card, with a transit user account. It will be understood that, additionally or alternatively to a touch screen display, other input interfaces may be utilized to accept input from a user. This can include, but is not limited to a touchpad, keyboard, mouse, trackball, audio input interface, joystick, etc.

If the user chooses an option requiring payment, the user may be instructed, by menu prompts, pre-recorded video and/or audio, on how to proceed with the payment. The user can be given a choice to pay in cash or by a payment card. For cash purchases, the user is instructed to insert coins or bills into the coin slot 436 or the bill loader 428. For payment card purchases, the user is instructed to insert payment card into the magnetic stripe card reader 412, or touch a contactless payment card 310 to contactless card reader 418.

Different processes may be implemented if the user chooses to enable a contactless payment card 310 as media fare 250. For example, the user can be instructed to touch a contactless payment card 310 to contactless card reader 418. Additionally, the user would be instructed to insert the contactless payment card 310 into the magnetic stripe card reader 412 and/or input the imprinted and/or embossed PAN 314 by using the keypad 416, the display system 404 (if it includes touchscreen capabilities), or both. Alternatively, for TVMs 212 with a contactless card reader 418 coupled with a magnetic stripe card reader 412, a user can be instructed to insert the contactless payment card 310 into the magnetic tripe card reader 412, allowing the TVM 212 to read both the contactless and magnetic stripe information from the contactless payment card 310. The TVM 212 can be configured to provide additional functions such as allowing the user to purchase a product, activate the contactless payment card 310 as fare media 250, and/or create a transit user account, by, for example, accepting additional input through any one of the user interfaces described above. Additionally or alternatively, the TVM 212 can simply print out an activation code on a receipt and provide the receipt to the user from the change/receipt slot 420. The transit system 100 can associate the activation code with information collected from the contactless payment card 310, enabling the user to perform any of the additional functions listed above at a TVM 212, ticket booth, website and/or other system at a subsequent point in time.

It will be understood that any or all of the features and/or capabilities of the TVM 212 described above may be included in other locations and/or devices of the transit system 100. A user may therefore register a contactless device, such as a contactless payment card 310, as media fare at other locations of the transit system 100. For example ticket booth computers 220 can be coupled with contactless card readers and/or magnetic stripe card readers, allowing a user to perform any or all of the functions described above by providing a contactless payment card 310 to a transit worker at a ticket booth. Additionally or alternatively, other devices may be configured to read contactless and magnetic stripe information from a contactless payment card 310 and transmit the information to a central ticketing system 112 of the transit system 100, without having the additional functionality of a TVM 212. Such devices further can be configured to print a receipt with an activation code, enabling a user to complete, at a later point in time, the process of activating a contactless payment card 310 for use as media fare 250. Moreover, these procedures may be carried out at a sales office, automated teller machine, and/or other manned or unmanned locations.

Figure 6A:
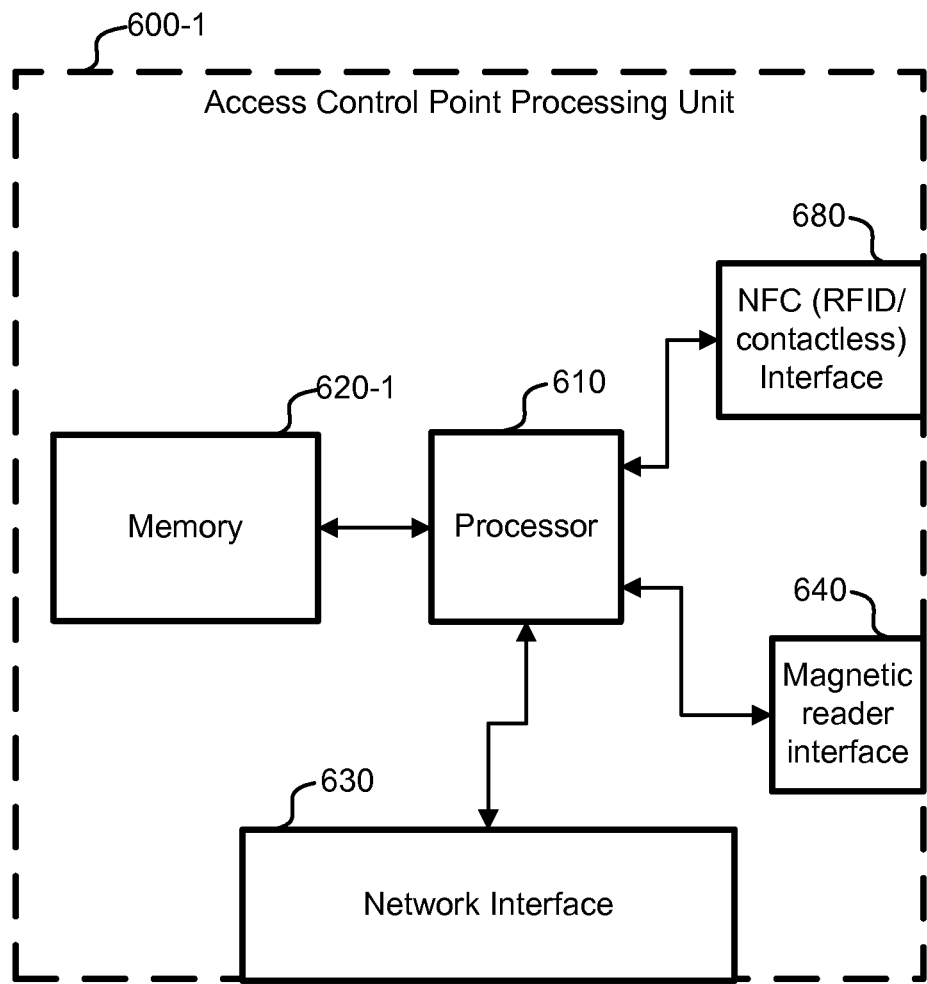
FIG. 6A is a simplified block diagram of an embodiment of an access control point processing unit of a transit system.

FIG. 6A is a simplified block diagram of an embodiment of an access control point processing unit 600-1, which can be coupled with and/or integrated into access control points 208 of a transit system 100 and can control certain physical properties of access control points 208 such as to allow or deny passage of a user. Among other things, the access control point processing unit 600-1 can be used to read an identification code, such as a contactless PAN and/or other contactless information, from fare media. The access control point processing unit 600-1 also can determine whether to permit passage of a user at the access control point 208. Interfaces such as an NFC interface 680 (which can read RFID and contactless information), and/or magnetic reader interface 640, can be used to receive information from fare media 250, including an identification code. Alternative embodiments contemplate access control processing units 600 without a magnetic reader interface 640. Once the identification code is received, it can then be sent to processor 610.

In addition to performing any decryption and/or verifying any security features, the processor 610 can compare the identification code against lists stored in memory 620-1 and/or other data store to determine whether to allow passage of the user at the access control point 208. Lists can be generated and maintained from a central system, such as the central ticketing system 112. The central system can send updated list information to station server 224 via WAN 140 or directly with the central ticketing system 112 through WAN 140 (e.g., the Internet) or LAN 240. The station server 224 can store updated list at the station data store 216 and/or communicate the updated list information via LAN 240 to access control point processing unit 600-1, which receives the information at network interface 630. U.S. patent application Ser. No. 12/833,404, entitled "Reloadable Prepaid Card Distribution, Reload, And Registration In Transit," (hereafter, the "'404 Application") which is incorporated herein, details how the transit system 100 and access control point processing units 600 may use lists to determine whether to allow passage of the user at access control points 208. Once the determination is made, the processor 610 can cause the access control point processing unit 600-1 to physically allow or deny passage of a user at the access control point 208.

The access control point processing unit 600-1 can also log transaction information in memory 620-1 and/or communicate the transaction information to station server 224 with a network interface 630. The station server 224 can, in turn, send the transaction information to the central ticketing system 112, which can store the information in central data store 114. The transaction information can be used to update transit user accounts associated with the transactions and to settle with a funding source 165.

Figure 6B:
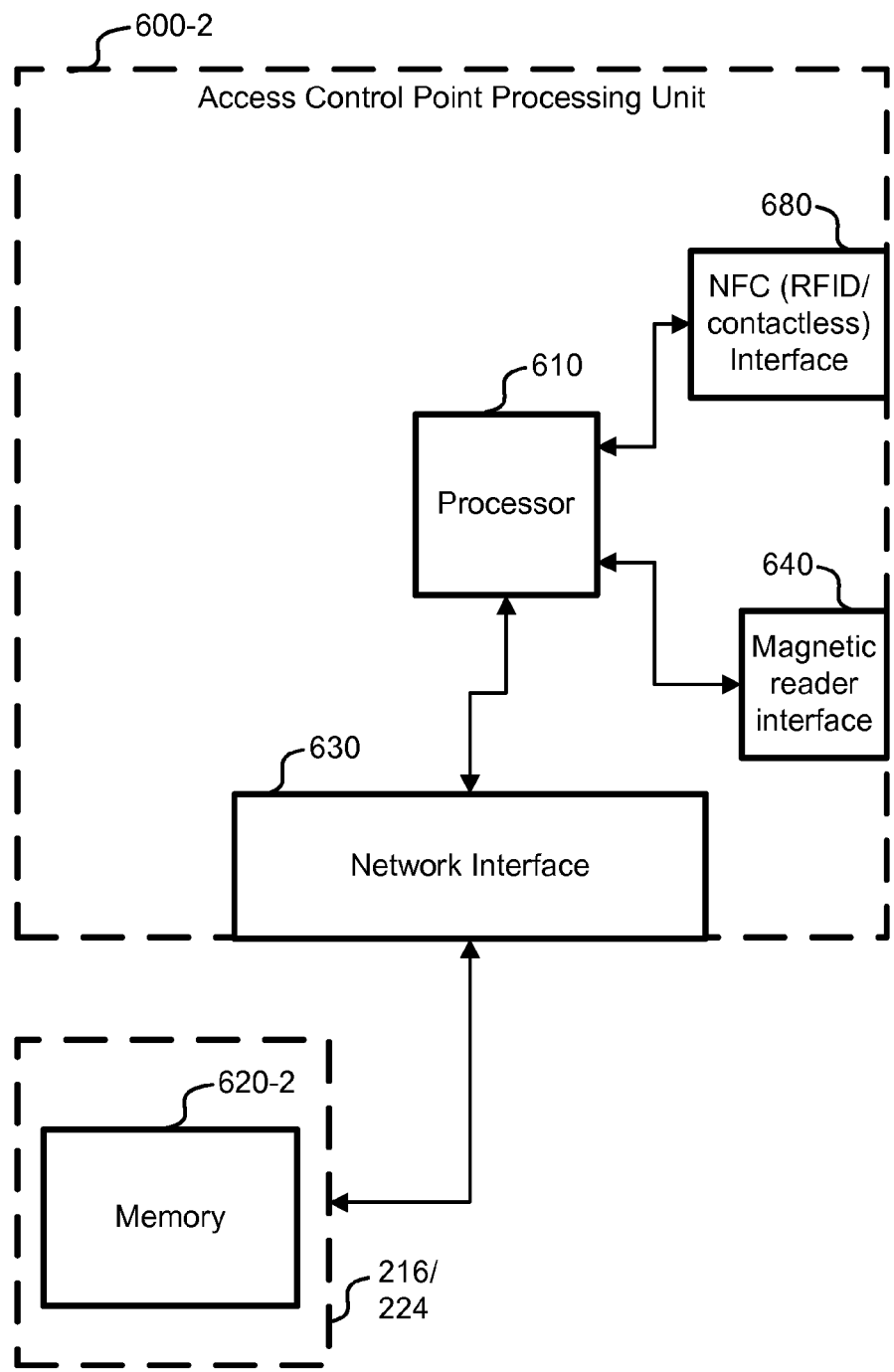
FIG. 6B is a simplified block diagram of an alternative embodiment of an access control point processing unit of a transit system.

FIG. 6B is a simplified block diagram of an alternative embodiment of an access control point processing unit 600-2. As illustrated, a memory 620-2 may be located at a source external to access control point processing unit 600-2. The external source can include, for example, station server 224 or station data store 216. In such an embodiment, the processor 610 may communicate with the external source in deciding whether to allow or deny passage of a user at an access control point 208, or the decision may be made by station server 224. In either case, it is desirable to make the decision quickly, often in 500 milliseconds or less. Thus, in this embodiment, it can be desirable that the connection between access control point processing unit 600-2 and the external source having memory 620-2 have sufficient speed and minimal latency to provide for a quick decision. Methods of allowing or denying access to a user at access control points 208, as well as methods of processing transactions received from access control points 208, are described in more detail in the '404 Application.

Figure 7A:
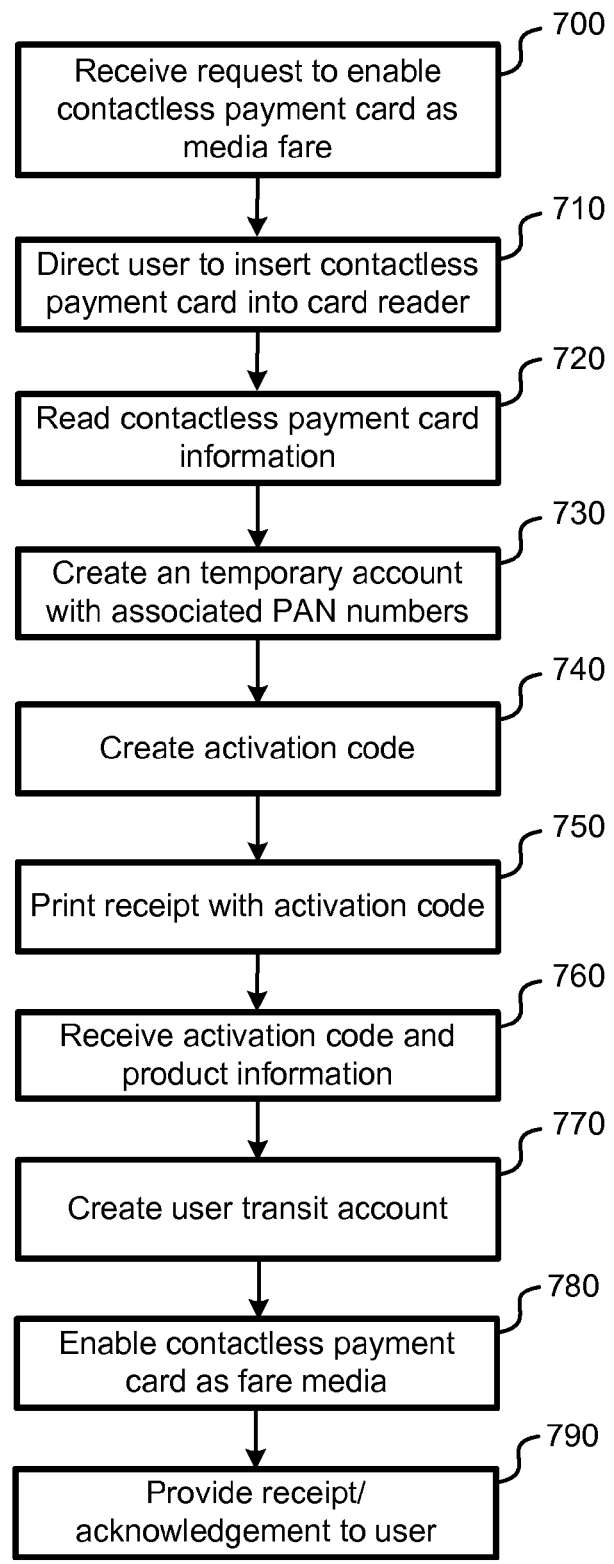
FIG. 7A is a diagram of a method for enabling a contactless payment card to be used as fare media in a transit system, according to some embodiments.

FIG. 7A is a diagram of an embodiment of a method for enabling a contactless payment card 310 to be used as fare media 250 in a transit system 100 providing account-based transactions. Beginning at block 700, a request is received to enable a contactless payment card 310 as media fare. For example, a user may select a menu option at a TVM 212 to make such a request. At block 710, a user is directed to insert a contactless payment card 310 into a card reader.

At block 720, card information is read. As described above, a device such as a TVM 212 may include a magnetic stripe card reader 412 integrated and/or coupled with a contactless card reader 418 such that the device can read the magnetic stripe and contactless information at the same time. Alternative embodiments contemplate variations on reading card information. For instance, where card readers are not integrated, the user may be directed to tap a contactless card reader 418 and insert the card into a magnetic stripe card reader 412 separately, in which case, the contactless and magnetic stripe information correspondingly is read in discrete steps.

In some instances, the contactless PAN may match the PAN of the magnetic stripe. However, to overcome the problems introduced by multiple cards with an identical PAN, a unique "fingerprint" of the contactless payment card 310 can be identified. To do so, additional track data components can be used to decipher one contactless PAN from another. For instance, track data includes name and expiry data. Additionally, some card issuers place a sequence code into the track data to make the contactless payment card 310 uniquely distinguishable. Thus, in addition to reading the contactless PAN and the PAN of the magnetic stripe, the device in which a user inserts and/or taps a contactless payment card 310 can be configured to read additional contactless track data, such as a sequence code, account holder name, and/or expiry date. Access control points 208 of the transit system 100 can be similarly configured to read the additional contactless track data to be able to access the uniquely distinguishable information.

Because the PAN of the magnetic stripe is typically identical to the imprinted and/or embossed PAN 314, a device may be configured to receive the imprinted and/or embossed PAN 314 rather than the PAN of the magnetic stripe. For instance, a TVM 212 can be configured to allow a user to manually enter the imprinted and/or embossed PAN 314 using a keypad 416 or touchscreen. Moreover, a device may have visual scanning capabilities to read the imprinted and/or embossed PAN 314 directly. It will be understood that other information such as an expiry date or account holder name, can be read from the magnetic stripe and/or otherwise received by the transit system.

At block 730, a temporary account with associated PAN numbers, and any additional contactless track data, is created. The account simply can comprise an association of the contactless data with the other provided information. At block 740, an activation code is created, and at block 750, a receipt with the activation code is provided to the user.

At block 760, the activation code is provided, along with product information. The activation code and product information is associated with the information received earlier, and, at block 770, a user transit account is created. The transit user account can comprise the information of the temporary account in addition to the product information provided at block 760. It may also include additional information provided by a user, as well as the activation code. For example, after receiving a receipt with the activation code, a user can provide the activation code at a website and purchase a product, such as a monthly pass.

A user may provide additional information to personalize the transit user account. For example, a user may provide a name, phone number, address, email address, social security number (SSN) or other government-issued identifier, a drivers license number, a username, a passcode (such as a personal identification number (PIN) or a password), other identification verification information, and/or funding information. Depending on the desired functionality of the transit system, a user also may input information regarding opt-in or opt-out selections for additional services, user preferences, and/or additional product(s) for purchase to be associated with a transit user account. The account further may include other data generated by the transit service provider.

At block 780, the contactless payment card 310 is enabled as fare media, and a receipt and/or acknowledgement is provided to the user at block 790. Enabling the contactless payment card 310 for use as fare media within the transit system 100 can comprise sending the contactless information (e.g. uniquely-identifying information) of the contactless payment card 310 to a central database, such as the central data store 114 and/or multiple remote databases, such as the station data store 216, with which access control points 208 can communicate. Additionally or alternatively, the contactless information may be propagated to the access control points 208 themselves. Thus, in subsequent transactions where the contactless information is read from the contactless payment card 310 at an access control point 208, the access control point 208 can recognize the information as being related to a valid transit user account and allow a transit user access accordingly.

It will be understood that embodiments contemplate numerous variations to the method shown in FIG. 7A. For example, although providing a receipt with a activation code is desirable, it is not required. Rather than provide an activation code, a method include simply receiving the imprinted and/or embossed PAN, which a user can provide a subsequent registration over the Internet, at a ticket booth, or at another location of the transit system 100. Additionally or alternatively, embodiments contemplate allowing a user to link information received from the contactless payment card 310 to an existing user account. For instance, a user can provide user information contained in the transit user account, such as a username and/or passcode, at any time before or after information is read from the contactless payment card 310, allowing a the contactless and other information to be associated with the user account.

Figure 7B:
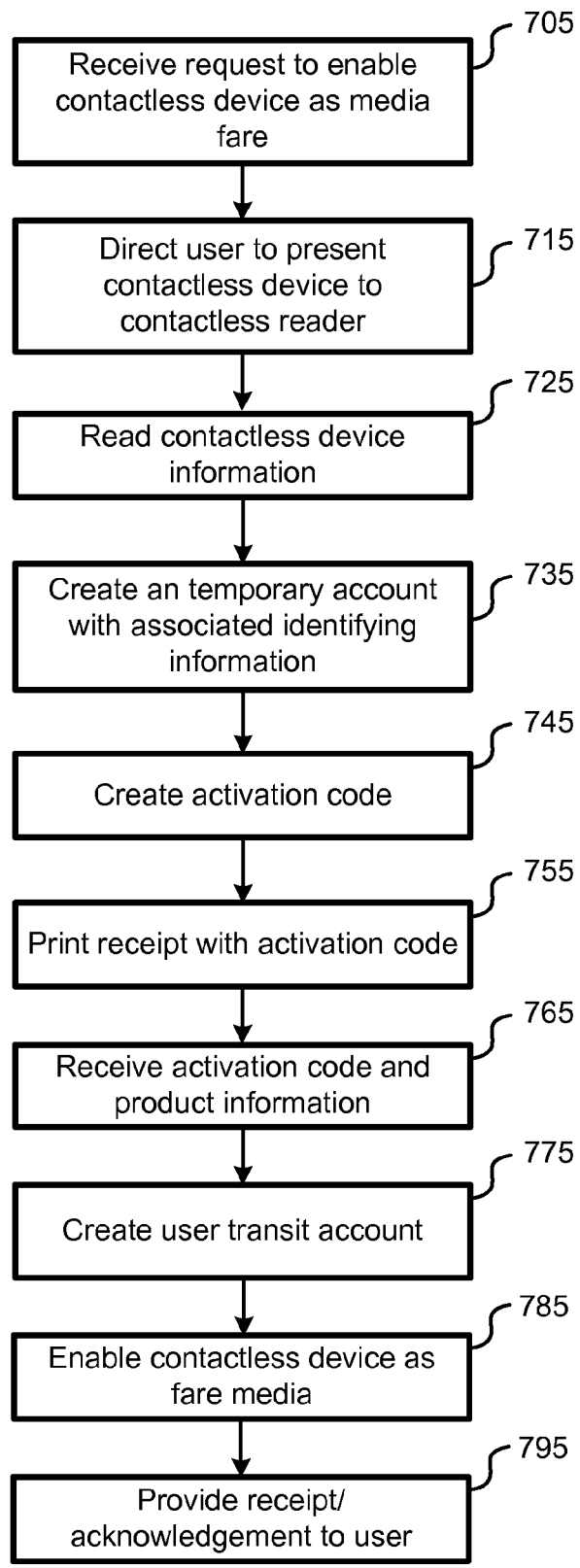
FIG. 7B is a diagram of an alternative method for enabling a contactless payment card to be used as fare media in a transit system, according to some embodiments.

FIG. 7B illustrates how a method similar to that shown in FIG. 7A can be extended to apply more broadly to contactless devices. Access control points 208 can be configured to read wireless information from contactless devices other than contactless payment cards 310, such as NFC-enabled mobile devices, RFID tags/stickers, contactless identification cards, etc. These devices may have contactless information uniquely identifying the device that may differ from information from another source of the device. Accordingly, a transit, transportation, or similar system can be configured to enable such contactless devices for use within the system in a manner similar to that of contactless payment cards 310.

Figure 8A:
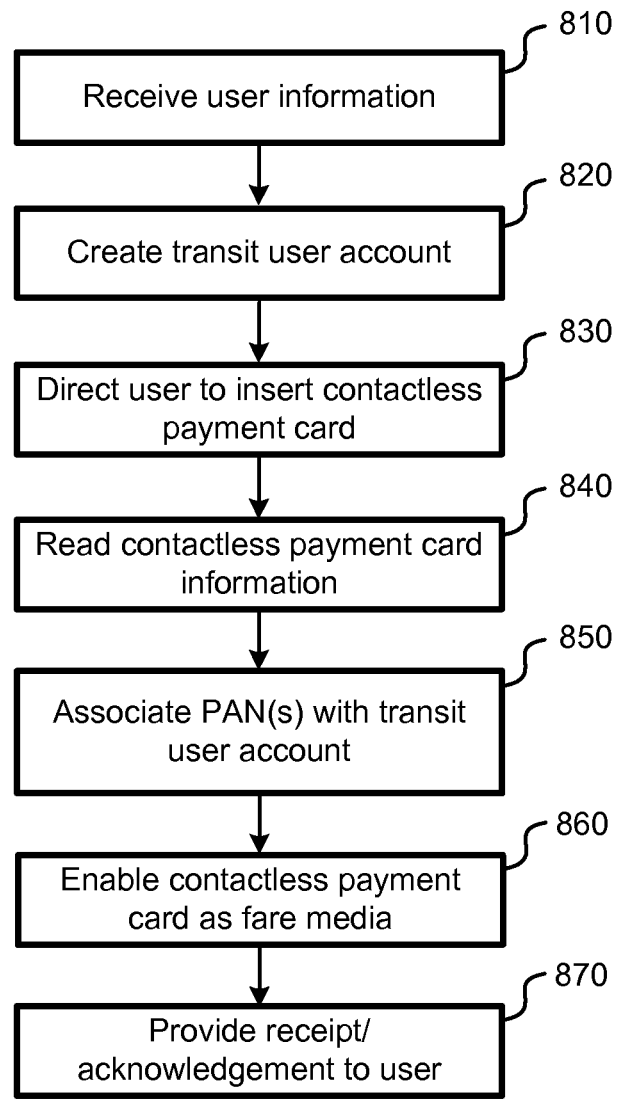
FIG. 8A is a block diagram of yet another method for enabling a contactless payment card for use as media fare in a transit system, according to some embodiments.

FIG. 8A is a block diagram of an embodiment of another method for enabling a contactless payment card 310 for use as media fare 250 in transit system 100. FIG. 8A illustrates how a user account may be created before information is read from the contactless payment card 310. FIG. 8A also demonstrates how the creation of the transit user account and the enablement of the contactless payment card 310 as fare media 250 can be done in a single session, without requiring additional steps at a later point in time.

At block 810, user information is received, and at block 820, a transit user account is created. Similar to the user information described above, the user information can comprise any of a variety of information, including product and payment information, among other things. At block 830, a user is directed to insert a contactless payment card 310. And at block 840, information is read from the contactless payment card, including contactless information. The information may also include information from a magnetic stripe, bar code, imprinted and/or embossed characters, and/or other sources of information.

At block 850, the contactless information, including a PAN, is associated with the transit user account. A PAN provided by another data source of the contactless payment card can also be associated with the transit user account. After which, at block 860, the contactless payment card 310 is enabled as fare media. And at block 870, a receipt and/or other acknowledgement is provided to the user. It will be understood that certain blocks, such as blocks 840-870, can be repeated at any time to allow a user with an existing transit user account to enable a handheld media, such as a contactless payment card or other NFC-enabled device, to be used as fare media. Such occasions can arise, for example, when a card issuer provides a user with a new contactless payment card before the expiry of an existing payment card.

Figure 8B:
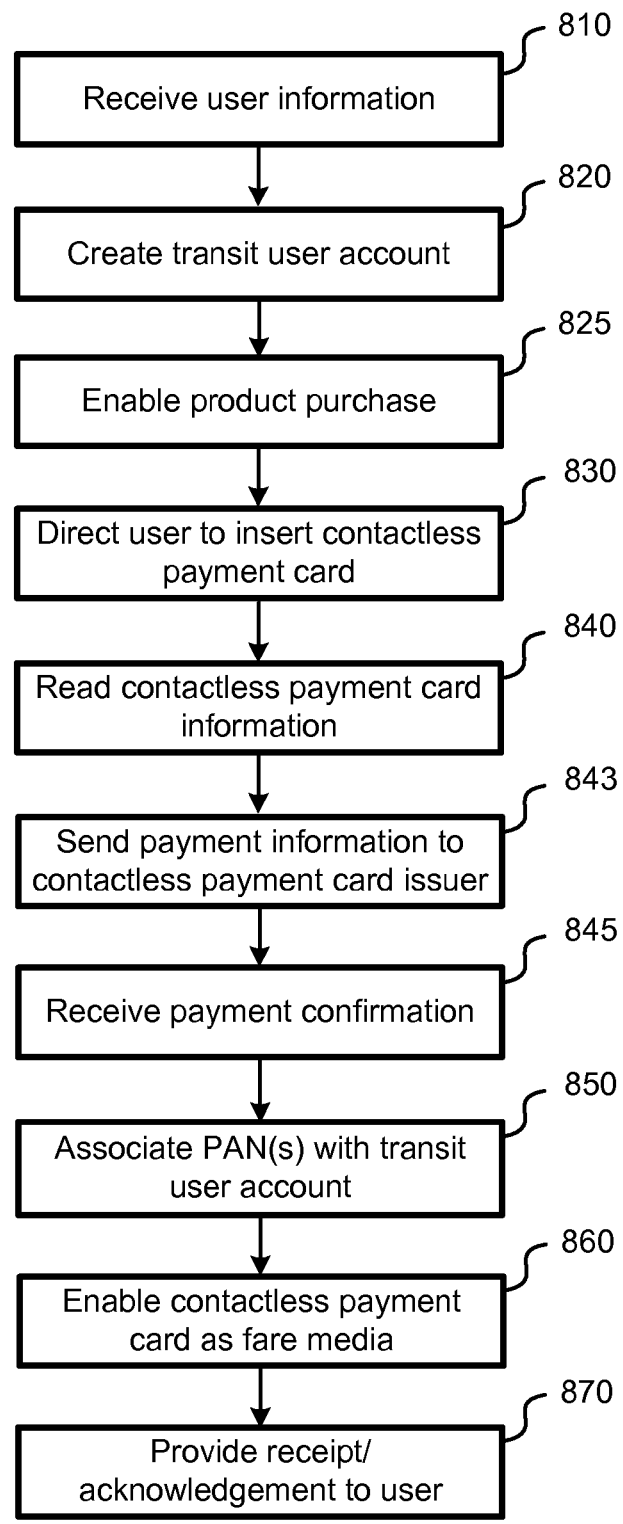
FIG. 8B is an embodiment of a method that incorporates the enablement of a contactless payment card for use as fare media with the payment of a transit and/or transportation product using the contactless payment card.

FIG. 8B is an embodiment of a method that incorporates the enablement of a contactless payment card 310 for use as fare media 250 with the payment of a transit and/or transportation product using the contactless payment card 310. In addition to the steps shown in FIG. 8A, the embodiment of FIG. 8B includes block 825, enabling product purchase. This can include, for example, allowing a user to select a transit and/or transpiration product from a menu. Additionally, block 843, payment information, such as the PAN, expiry date, and other information is sent to a card issue for verification. At block 845, payment confirmation is received. As with all methods described herein, numerous variations may be made. For example, at any of a variety of points during the process, a user may be allowed to select whether or not to enable the contactless payment card 310 for use as fare media 250. It will be understood further that other embodiments described herein can incorporate payment of a product with the contactless payment card 310 similarly.

Figure 9:
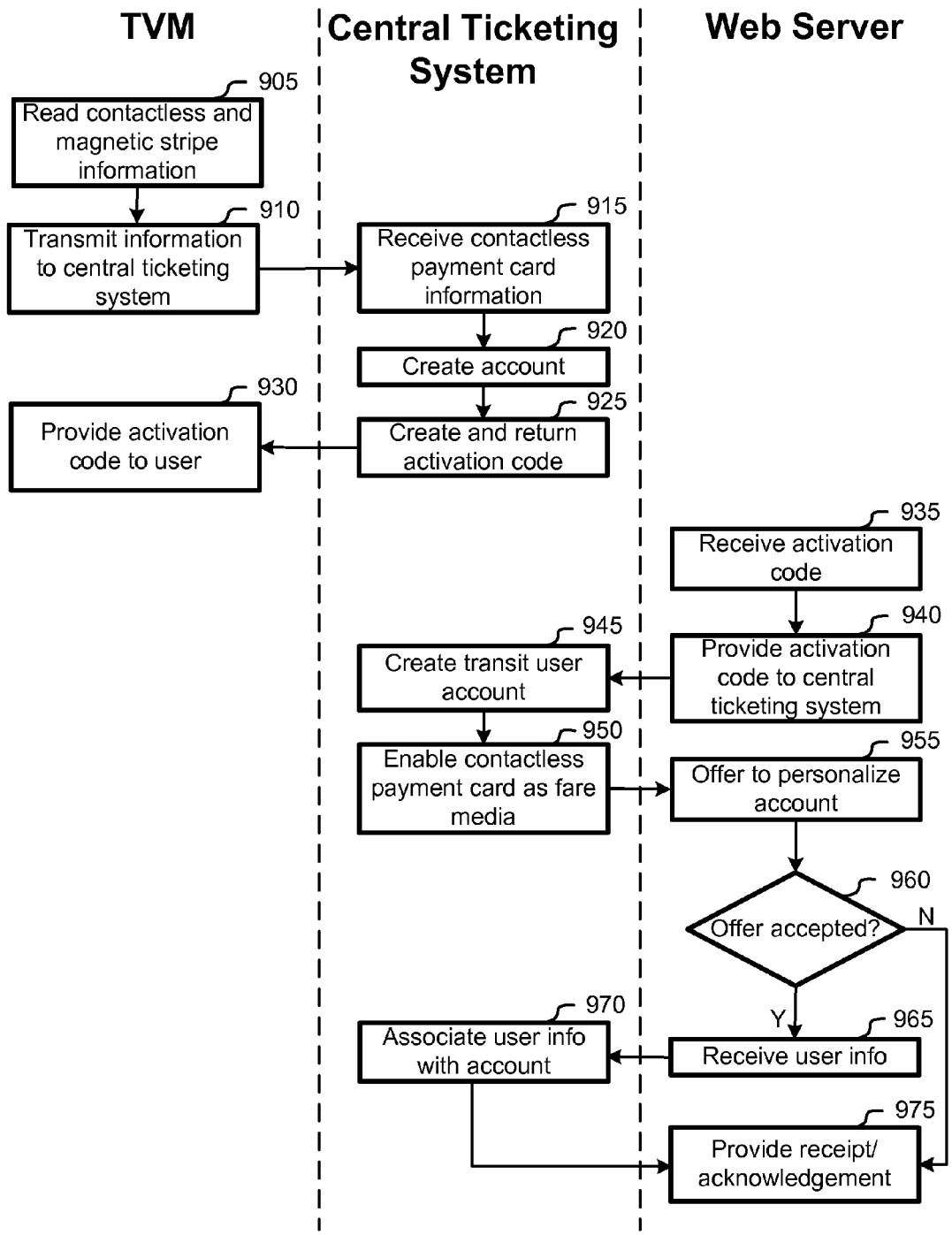
FIG. 9 is a swim-lane diagram of yet another embodiment of a method for enabling a contactless payment card for use as fare media.

FIG. 9 is a swim-lane diagram of yet another embodiment of a method for enabling a contactless payment card 310 for use as fare media 250. FIG. 9 illustrates how the steps of the method may be performed by a TVM 212, a central ticketing system 112, and a web server. The web server can host a web site for receiving input from a user. Such a web server can be maintained or otherwise communicatively connected with the central ticketing system 112. Moreover, the web server comprise part of the central control system 110 of a transit system 100.

At block 905 the TVM 212 reads the contactless and magnetic stripe information from a contactless payment card 310. At block 910 all, or at least a part, of the information is communicated to the central ticketing system 112. At block 915, the central ticketing system 112 receives the information, and at block 920, creates the account. At block 925, the central ticketing system 112 can then create and return an activation code. At block 930, the TVM 212 provides the activation code to the user.

With the activation code, the user can then access a website hosted by the web server to complete the enablement process. At block 935, the web server receives the activation code. This can be done, for example, simply by providing a website with a small form to fill out and submit, including a text box for the activation code. Product and payment information may also be received by the web server. At block 940, the web server provides the activation code to the central ticketing system 112.

At block 945, the central ticketing system 112 creates a transit user account with, among other things, information received at block 935. At block 950, the central ticketing system enables the contactless payment card 310 as fare media in the transit system 100. The central ticketing system 112 can notify the web server that the contactless payment card 310 has been enabled.

At block 955, or alternatively at an earlier point in the process, the web server can further offer to personalize the transit user account. At block 960, if the offer is rejected, the web site can, at block 975, simply relay receipt and/or acknowledgement information to the user. Otherwise, at block 965, the web server can receive additional information from the user by, for example, providing an additional online form, which is submitted by the user. The information is relayed to the central ticketing system 112, and at block 965, associated with the transit user account. At block 970, the web server provides receipt and/or acknowledgement information to the user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

What is claimed is:

1. A method for enabling a first handheld media having near-field communication (NFC) capabilities for use as fare media in a transit system providing account-based products, the method comprising:
    receiving a first account identifier from a first source of the first handheld media, wherein:
        the first account identifier is unique to the first handheld media, the first account identifier including a primary account number (PAN); and
        the first source comprises an NFC interface; receiving a second account identifier from a second source of the first handheld media, wherein the second account identifier is different than the first account identifier;
    responsive to receiving the first account identifier and the second account identifier from the first handheld media, creating a transit user account for managing transactional information of a user of the transit system, the transit user account having:
        information including the first account identifier and second account identifier; and
        information associating the account with a transit product;
    enabling the first handheld media for use as fare media at one or more access control points of the transit system;
    receiving, at an access point of the transit system, a third account identifier from an NFC interface of a second handheld media, the third account identifier including the PAN of the first account identifier;
    determining that the second handheld media is not associated with the transit product associated with the first handheld media; and
    denying a person the ability to use the transit product associated with the first handheld media based, at least in part, on the determination.

2. The method of claim 1, wherein the first account identifier further includes one or more of:
    a sequence code;
    a name of an account holder; or
    an expiry date.

3. The method of claim 2, wherein the second account identifier comprises one or more of:
    a PAN;
    a name of an account holder; or
    an expiry date.

4. The method of claim 3, wherein:
    the second account identifier comprises a PAN; and
    the PAN of the second account identifier is different than the PAN of the first account identifier.

5. The method of claim 1, wherein the second source of the first handheld media comprises one or more of:
    a magnetic stripe;
    a bar code; or
    a visible number or code.

6. The method of claim 1, further comprising:
    providing an activation code at a first location; and
    receiving the activation code at a second location prior to the enabling the first handheld media for use as fare media at the one or more access control points of the transit system.

7. The method of claim 1, further comprising:
    receiving information from the user of the transit system; and
    including at least a portion of the information received from the user of the transit system in the transit user account.

8. The method of claim 1, wherein the first handheld media comprises:
    a contactless payment card;
    an identification card;
    a mobile device with NFC capabilities; or
    a radio frequency identification (RFID) tag.

9. The method of claim 8, wherein:
the first handheld media comprises a contact less payment card; and
the method further comprises receiving payment for the transit product, wherein the payment is funded with a financial account associated with the payment card.

10. A machine for enabling a contactless device for use as fare media in a transportation system providing account-based products, the machine comprising:
a network interface configured to communicate with a network;
a first input interface, the first input interface configured to receive information from radio frequency (RF) signals;
a second input interface configured to receive information;
a processor communicatively coupled with the network interface, the first and second input interfaces, and a memory; and
the memory having instructions that, when executed by the processor, cause the machine to:
receive RF signals via the first input interface, the RF signals communicating a first account identifier from a first source of the contactless device, wherein the first account identifier includes data unique to the contactless device;
receive, via the second input interface, a second account identifier from a second source of the contactless device, wherein the second account identifier is different than the first account identifier;
send, via the network interface, information including the first account identifier and second account identifier;
upon sending the first account identifier and second identifier, receive, via the network interface, an activation code for enabling the contactless device for use as fare media at one or more access control points of the transportation system for creating a transit user account; and
provide the activation code to a user of the machine.

11. The machine of claim 10, wherein the second input interface comprises:
a magnetic stripe reader;
a bar code reader;
a keyboard;
a keypad; or
a touchscreen.

12. The machine of claim 11, further comprising a receipt printer, wherein the machine provides the activation code on a receipt.

13. The machine of claim 10, wherein the first account identifier, the second identifier, or both, comprises a primary account number (PAN).

14. The machine of claim 10, wherein the memory further includes instructions that, when executed by the processor, cause the machine to:
receive information from the user of the machine; and
send, with the network interface, at least a portion of the information from the user of the machine.

15. The machine of claim 14, further comprising a third input interface configured to receive the information from the user of the machine.

16. The machine of claim 14, wherein the information from the user of the machine includes one or more of:
a unique identifier of the user;
a passcode and/or personal identification number (PIN);
a funding source;
a payment amount;
a name;
an address;
a telephone number;
an indicator of an opt-in and/or opt-out selection;
an email address; or
a product and/or service of the transportation system.

17. The machine of claim 10, wherein the contactless device comprises:
a payment card;
an identification card;
a mobile device with near-field communication (NFC) capabilities; or
a radio frequency identification (RFID) tag.

18. The machine of claim 17, wherein:
the contactless device comprises a payment card; and
the memory further includes instructions that, when executed by the processor, cause the machine to receive payment for a transit product, wherein the payment is funded with a financial account associated with the payment card.

19. A method for enabling a payment card for use as fare media in a transit system providing account-based products, the method comprising:
creating a transit user account for managing transactional information of a user of the transit system, the transit user account having information associated with the user and a transit product;
receiving a first account identifier from the payment card, wherein:
the first account identifier includes data unique to the payment card; and
the first account identifier is stored on a first account information repository of the payment card and communicated with a contactless interface of the payment card;
receiving a second account identifier from a second account information repository of the payment card, wherein the second account identifier is different than the first account identifier;
responsive to receiving the first account identifier and the second account identifier from the first handheld media, associating the first and second account identifiers with the transit user account;
enabling the payment card for use as fare media at one or more access control points of the transit system;
receiving, at an access point of the transit system, the first account identifier from the contactless interface of the payment card; and
providing the user of the transit system the ability to use the transit product associated with the transit user account.

20. The method of claim 19, wherein the payment card comprises a first payment card and the first account identifier comprises a primary account number (PAN), the method further comprising:
receiving, at an access point of the transit system, a third account identifier from a contactless interface of a second payment card, the third account identifier including the PAN of the first account identifier;
determining that the second payment card is not associated with the transit product; and
denying a person the ability to use the transit product associated with the first payment card based, at least in part, on the determination.

21. The method of claim 19, wherein the second account information repository of the payment card comprises one or more of:
a magnetic stripe;
a bar code; or
a visible number or code.

* * * * *

UNITED STATES PATENT AND TRADEMARK OFFICE
CERTIFICATE OF CORRECTION

PATENT NO. : 8,991,699 B2  Page 1 of 1
APPLICATION NO. : 12/877691
DATED : March 31, 2015
INVENTOR(S) : Philip B. Dixon et al.

It is certified that error appears in the above-identified patent and that said Letters Patent is hereby corrected as shown below:

In the Claims:

Column 19, line 2, please delete "contact less" and insert --contactless--.

Column 20, line 39, please delete "first handheld media," and insert --payment card--.

Signed and Sealed this
Eleventh Day of August, 2015

Michelle K. Lee
*Director of the United States Patent and Trademark Office*